United States Patent
Gilson et al.

(10) Patent No.: US 9,203,746 B2
(45) Date of Patent: Dec. 1, 2015

(54) HIERARCHICAL RESOURCE MANAGEMENT FOR SWITCH ASSEMBLY SYSTEMS

(71) Applicant: Ciena Corporation, Hanover, MD (US)

(72) Inventors: David Gilson, Honolulu, HI (US); Kyle Gosselin-Harris, Greenacres, WA (US); Michael Chartier, Liberty Lake, WA (US)

(73) Assignee: Ciena Corporation, Hanover, MD (US)

( * ) Notice: Subject to any disclaimer, the term of this patent is extended or adjusted under 35 U.S.C. 154(b) by 295 days.

(21) Appl. No.: 14/051,903

(22) Filed: Oct. 11, 2013

(65) Prior Publication Data

US 2015/0103821 A1    Apr. 16, 2015

(51) Int. Cl.
*H04L 12/911* (2013.01)
*H04L 12/775* (2013.01)
*H04L 12/917* (2013.01)

(52) U.S. Cl.
CPC .......... *H04L 45/58* (2013.01); *H04L 47/76* (2013.01); *H04L 47/782* (2013.01); *H04L 47/821* (2013.01)

(58) Field of Classification Search
None
See application file for complete search history.

(56) References Cited

U.S. PATENT DOCUMENTS

2008/0037505 A1*  2/2008  Kim ...................... H04W 72/04
                                                              370/343

\* cited by examiner

*Primary Examiner* — Benjamin H Elliott, IV
*Assistant Examiner* — Brian Cox
(74) *Attorney, Agent, or Firm* — Clements Bernard PLLC; Christopher L. Bernard; Lawrence A. Baratta, Jr.

(57) ABSTRACT

Managing resources in a multi-level switch assembly system, includes a resource tree with the multiple hierarchical levels, wherein a first level device is associated with a first level, one or more second and third level devices are associated with lower, second and third levels respectively, and so on. Cost tokens are assigned to the various devices based on their corresponding resource requirements. Resources of the multi-level switch assembly system, such as, ports and/or bandwidth, are dynamically allocated to the first, second, third level devices, and so on, based on their corresponding cost tokens in a hierarchical manner.

26 Claims, 2 Drawing Sheets

HIERARCHICAL RESOURCE MANAGEMENT FOR SWITCH ASSEMBLY SYSTEMS

FIELD OF DISCLOSURE

Disclosed embodiments relate to resource management in switch assembly systems. For example, some embodiments relate to a hierarchical management of hardware resources in a multi-level switch assembly system.

BACKGROUND

There is an ever increasing need for high speed and high performance computer networks which can support high bandwidths. Ethernet is a commonly used technology for such high speed and high performance computer networks. Ethernet systems can be based on IEEE 802 standards, and typically employ several layers of hardware resources to enable network switching and routing functions. The well known open systems interconnect (OSI) 7-layer reference model specifies inter alia, a physical layer which defines electrical and physical specifications for devices connected to a network and a data link layer which specifies functional and procedural means for transferring data between network devices and entities. Ethernet technology can span both of these layers, and generally include hardware devices such as routers, repeaters, bridges, switches, blades, ports, etc.

In general, the devices in an Ethernet switch assembly system tend to follow a hierarchical structure. For example, a chassis is a frame or box which can support mounting of components of a device. The chassis can have multiple blades or "line blades." Ports may be connected to the line blades. Hardware devices, such as, end user network devices like personal computers, can be connected to the ports.

Representatively, the one or more chassis may make up a root level in a network fabric, one or more levels of blades may be branches, and one or more ports and devices connected thereto may comprise leaves. However, conventional management of resources tends to be compartmentalized. For example, each component such as a chassis, line blade, port, etc., is allocated a predefined amount of resources in terms of, for example, number of ports, bandwidth, etc. This leads to an overly restrictive provisioning of resources, as each component needs to draw from a static pool of resources that are pre-allocated to that component. This kind of management is inflexible, and does not allow easy sharing or realigning of resources among the multiple levels in a switch assembly system. As a result, the resources in the system cannot adapt effectively to widely divergent needs of components which are connected to the switch assembly system.

Moreover, different types of applications may be supported by a switch assembly system. For example, in the context of a typical home, an Ethernet switch assembly may support types of applications directed to connecting to external networks such as, the Internet and managing interconnections between various home devices, such as, multimedia consoles, printers, personal computers, etc. Each of these types of applications may require different resources at each level, and sometimes, resource requirements of each type of application may be in conflict. Conventional management of resources at a leaf level or line blade level based on pre-allocated resource quotas can be extremely inefficient in some scenarios.

In other words, the current infrastructure lacks efficient techniques to manage system resources in a finely tuned manner and adapt to dynamic and variant needs of system resources at each level in a multi level switch assembly system.

SUMMARY

Exemplary embodiments relate to hierarchical management of resources in a multi-level switch assembly system.

For example, an exemplary embodiment is directed to a method of managing a multi-level switch assembly system, the method comprising associating a resource tree with the multi-level switch assembly system. The method comprises associating a first level device to a first level of the resource tree, associating one or more second level devices to a second level of the resource tree, such that the first level device is a parent device of the second level devices, assigning cost tokens to the first level device and the second level devices based on the resource requirements of the first level device and the second level devices respectively, and dynamically allocating resources of the multi-level switch assembly system to the first level device and the second level devices based on the corresponding cost tokens in a hierarchical manner.

Another exemplary embodiment is directed to a multi-level switch assembly system comprising: a resource tree associated with the multi-level switch assembly system, wherein a first level device is associated with a first level of the resource tree. One or more second level devices are associated with a second level of the resource tree, such that the first level device is a parent device of the second level devices. Cost tokens are associated with the first level device and the second level devices based on the resource requirements of the first level device and the second level devices respectively, and resources of the multi-level switch assembly system are dynamically allocated to the first level device and the second level devices based on the corresponding cost tokens in a hierarchical manner.

Yet another exemplary embodiment is directed to a multi-level switch assembly system comprising: means for associating a resource tree with the multi-level switch assembly system, comprising: means for associating a first level device to a first level of the resource tree, means for associating one or more second level devices to a second level of the resource tree, such that the first level device is a parent device of the second level devices, means for assigning cost tokens to the first level device and the second level devices based on the resource requirements of the first level device and the second level devices respectively, and means for dynamically allocating resources of the multi-level switch assembly system to the first level device and the second level devices based on the corresponding cost tokens in a hierarchical manner.

Another exemplary embodiment is directed to a non-transitory computer-readable storage medium comprising code, which, when executed by a processor, causes the processor to perform operations for managing a multi-level switch assembly system, the non-transitory computer-readable storage medium comprising: code for associating a resource tree with the multi-level switch assembly system, comprising: code for associating a first level device to a first level of the resource tree, code for associating one or more second level devices to a second level of the resource tree, such that the first level device is a parent device of the second level devices, code for assigning cost tokens to the first level device and the second level devices based on the resource requirements of the first level device and the second level devices respectively, and code for dynamically allocating resources of the multi-level switch assembly system to the first level device and the second level devices based on the corresponding cost tokens in a hierarchical manner.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
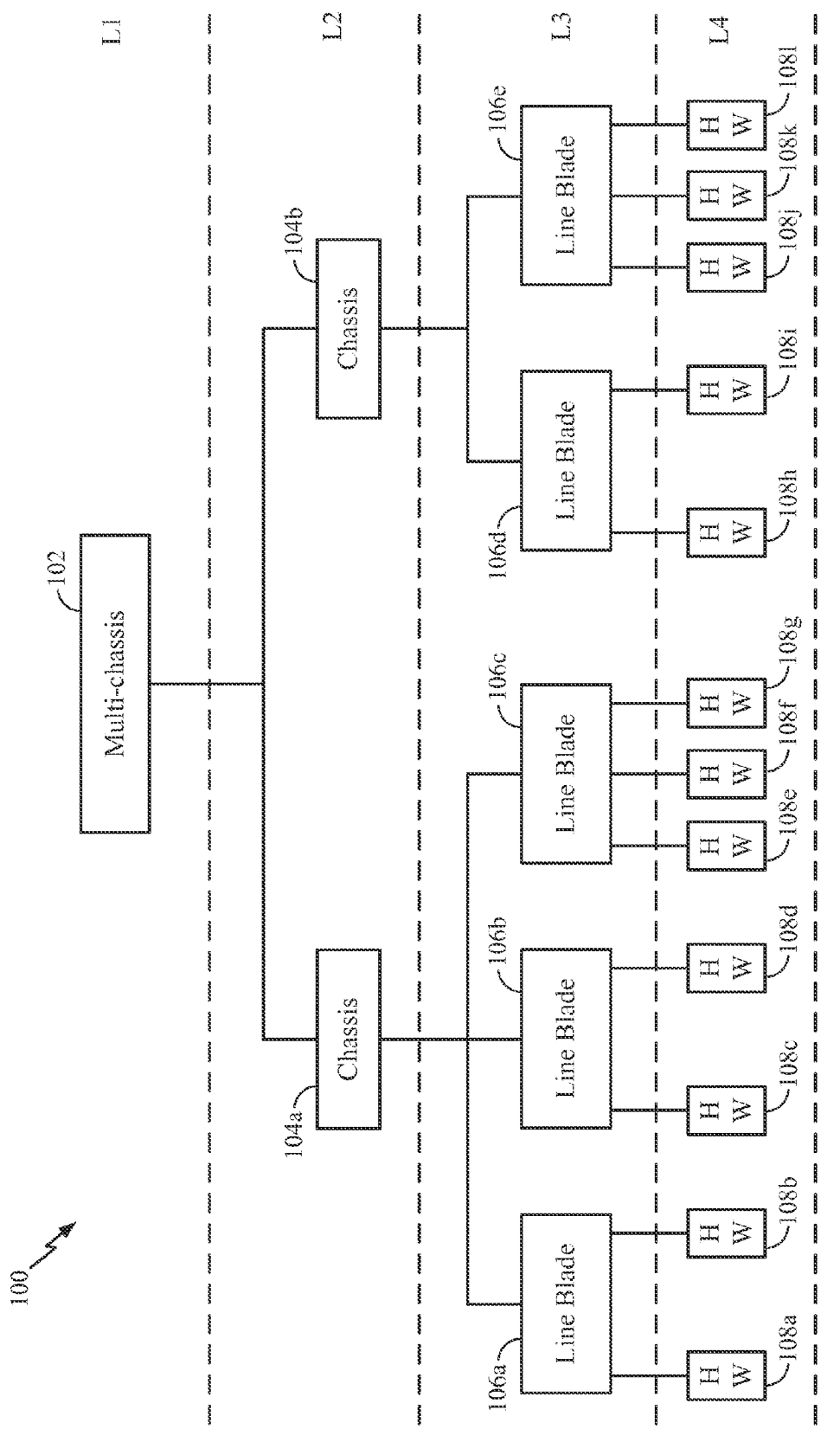
FIG. 1 illustrates an exemplary multi-level switch assembly system.

Aspects of the invention are disclosed in the following description and related drawings directed to specific embodiments of the invention. Alternative embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are directed to hierarchical management of resources in a switch assembly system, such as an Ethernet switch assembly system. In general, embodiments include systems and methods for managing resources in a multi-level switch assembly system by associating resource cost tokens with resources and dynamically allocating system resources to system components at each level by taking into account particular needs and dynamically updated resource availability. Embodiments avoid restrictive conventional methods of pre-allocating an invariable resource amount to each level or component of the system. Moreover, in some aspects, two or more types of applications are supported, wherein, the overall system resources are managed by taking into account the needs of each type of application.

In a more specific example, an exemplary multi-level switch assembly system 100 is depicted in FIG. 1. It will be understood that the representation of system 100 is a schematic view for the sake of ease of description of the embodiments and does not impose any restrictions on particular arrangements, symmetry, hardware structure, number of levels, component types, etc., and the description herein can be extended to any switch assembly system, particularly, multi-level switch assembly systems. As shown, system 100 includes multi-chassis 102 at level L1 (also referred to as the root level in some cases). However, the exemplary aspects can be easily extended to any other switch assembly structure which may not have multiple chassis connected to each other, and may include, for example, a chassis at the root level. As such, level L1 may be referred to as a first level and multi-chassis 102 as a first level device accordingly. In general, the root level may be considered as a first level and devices connected to first level nodes at the first level thereto may be referred to as first level devices. In general, exemplary multi-level switch assembly systems can include one or more lower levels, which will be generally referred to as second level, third level, fourth level, . . . , and so on. Correspondingly, these one or more levels will have associated nodes and devices connected thereto. Examples of these will be provided in the following description.

As depicted in FIG. 1, multi-chassis 102 in the first level or level L1 can be coupled to one or more second level devices, such as, chassis 104a-b in a second level or level L2. Multi-chassis 102 can advantageously manage resources across the one or more chassis 104a-b in such a structure, thereby combining the overall pool of resources. For example, some resource allocations may straddle chassis boundaries or in other words, extend across multiple chassis without restrictions based on previously recognized maximum resource capabilities of each chassis. Proceeding further with the description of the tree-structure of system 100, at the next lower level, or third level or level L3, chassis 104a-b are coupled to one or more third level devices, such as, line blades 106a-e as shown. Even further below, in a fourth level or level L4 are shown one or more fourth level devices, such as, end user devices or hardware devices 108a-l. Each hardware device 108a-l may include one or more ports, which can be considered as fifth level devices in a fifth level or level L5, although not explicitly illustrated for the sake of clarity. The overall number of ports available in system 100 may comprise an indication of the resource pool of system 100. Yet another system resource can include bandwidth, wherein, an exemplary aspect can pertain to allocation of bandwidth to components at each of the system levels. In some aspects, resource allocation can relate to combined considerations of ports (or other hardware components) and related bandwidths.

In order to manage resource allocation in system 100 in a hierarchical manner, exemplary aspects relate to provisioning a resource map or resource tree which takes into account the overall system resources and new resource requests as well as currently allocated resources. More specifically, an initial resource tree can be generated, for example, at initial conditions or system initialization. This initial resource tree can account for each of the components of system 100 in each of the levels L1-L5 and their individual resource consumptions or allocations (e.g., number of ports used, bandwidth allocated to each component, etc.). As additions or deletions to the systems happen over time, based on components which can be added or removed at any of the levels, the accompanying changes are reflected in the resource tree in a hierarchical fashion. For example, a new second level device, such as, a new chassis may be added to level L2. In this case, the resource tree is updated in an upwards direction towards the root level or L1, as well as in a downward direction, in order to account for new line blades in level L3, and hardware devices and/or ports in levels L4 and/or L5 which may be introduced by the new chassis.

In general, if components of the resource tree (e.g., any of the components 102-108 discussed above) are referred to as "nodes" of the resource tree, then each node will have one parent node and one or more child nodes. For example, for if line blade 106e in level L3 is a node under consideration in system 100, then a resource tree encompassing system 100 would indicate chassis 104b in level L2 as a parent node of line blade 106e and hardware devices 108j-l in level L4, as well as, any ports or devices connected to ports thereto in level L5 as child nodes of line blade 106e. Thus, updating the resource tree by the addition of a node comprises propagating any changes introduced in resources upwards through the new node's parent node to the root level node, as well as, incorporating the resources introduced by the child nodes of the new node in a downward direction all the way to the lowest level. Once the resource tree is updated thus, the resources of system 100 can be re-evaluated to determine free resources for future allocation. Similarly, if any of the nodes are removed or deleted, then the resources that are freed up will be reflected by the corresponding update performed to the resource tree.

In exemplary embodiments, the above aspects of maintaining a dynamically updated version of the resource tree prevents over or under allocation. For example, if a user or device intends to connect to a particular node, such as, at line blade 106e (assuming this was previously not present, for the sake of this explanation), then in a first step, a pre-allocation check can be performed. In the first step, the pre-allocation check can include searching the resource tree in both upward and downward directions in order to determine whether the resources requested by line blade 106e are available and can be allocated. If the required resources can be allocated, then in a second step, the resource tree would allocate the required amount of resources to line blade 106e, i.e., to support line blade 106e and each of its child nodes, hardware devices 108j-l and their ports thereof. This second step of allocation can also be referred to as "burning" the required resources, herein. In a third step, if any of the allocated resources are no longer needed, or if line blade 106e is altogether detached or deleted, then the resource tree will be updated to reflect the freeing of the previously burned resources for 106e accordingly.

The above-enumerated three step process can be performed in exemplary aspects using exemplary cost tokens, which will be discussed in further detail in subsequent sections. Briefly, cost tokens are associated with each node, and they provide an indication of resource costs associated with the node. By recognizing cost tokens can be made efficient. For example, same or similar hardware devices may have same or similar cost tokens. Thus, maintaining a database of commonly occurring hardware devices in implementations of system 100, or remembering resources burned due to allocation of a particular device can help in simplifying the process of allocation, the next time a same or similar device needs to be allocated. It will be recognized that cost tokens can vary based on which level the particular device is attached to system 100. However, if a cost token is created or recognized for a particular device at a particular level, then for subsequent occurrences or introductions of the same device or same type of device (especially at the same level) would entail reuse of the previously created or stored cost token. Thus, system resources and processing complexity can be conserved.

In general, it will be understood that provisioning and managing the dynamic updates to the resource tree, for example, based on the exemplary cost token approach, can be performed by software application programming interfaces (APIs). The software APIs can be implemented by one or more hardware devices spread across system 100, or in a central processing unit (CPU) located at a root level, or any other hardware device located at any level (e.g., integrated on or coupled to multi-chassis 102). Skilled persons will recognize suitable implementations of hardware and software for the various aspects described herein, without departing from the scope of this disclosure.

Coming now to specific example implementations of cost tokens, exemplary embodiments include specific addressing schemes (or "keys" as referred to herein) for each node of system 100. This allows efficient resource management of the nodes. A resource management key (or "RM key") can relate to a unique identification of position of a node. More particularly, the RM key of a particular node can be based on the level at which the particular node is connected. In other words, the RM key can be based on the branch or route from the root level node to the particular node, with reference to intervening nodes traversed. The keys of every intervening parent node of the particular node, for example, are concatenated to derive the key of the particular node. Each segment of the concatenation can be represented by the nomenclature <level><port address>. In a more specific example, the root node, i.e. master-chassis 102 in system 100 can have the RM key "L1[102]." Similarly, the RM key for chassis 104b would be "L1[102].L2[104b]." Accordingly, the RM key for a particular port, say 110x (not shown) coupled to hardware device 108l of line blade 106e would be "L1[102].L2[104b].L3[106e].L4[108l].L5[110x]." In this manner, each node can be uniquely identified.

While the reference alpha-numerals 104a-b, etc., are used in the schematic representation of system 100, in particular Ethernet switch assemblies, these alpha-numerals may be replaced by other identifiers related to relative placement of ports or points of attachment to components at a particular node. For example, a similar identification as the alpha-numerals can be formed based on which one of, say, 30 ports of a chassis, a line blade is attached to. It will be understood that the example RM key formats are merely illustrative to convey a method of uniquely identifying the point of attachment of a particular node to a tree based on the intervening parent nodes leading to the root level, and any alternative addressing scheme on similar lines may be chosen without departing from the scope of the embodiments. Moreover, it will also be understood that a different root level may apply to particular implementations. For example, if a multi-chassis level is not present, then the chassis level currently designated as L2, may form the level L1 in that scenario. Regardless of the designation of a level or the number of levels, the RM key may be formed in such a manner as to uniquely identify each individual node of an exemplary switch system.

In some aspects, the RM key may further include a resource type, where more than one type of applications are to be supported by system 100. Accordingly, if two or more resource types may be applicable, then an identifier of the resource type for which a particular resource tree has been created can be appended to the previously described RM key. For example, if there are two types of resource types—1 and 2, and if the previously described attachment of the node 110x affects a resource tree for resource type 2, then the corresponding RM key could be represented as "[Resource type 2].L1[102].L2[104b].L3[106e].L4[108l].L5[110x]." Thus, the hierarchical resource management can be performed based on attachment or detachment of node 110x, taking into account the particular resource availabilities and other considerations for resource type 2 in this example.

Based on the above described RM key designations of each node, the resource tree can determine the number of child nodes or devices available at each node and associated cost tokens thereof. For example, if a particular node is to be added, then the above-described first step of pre-allocation checks would involve determining the RM key for the proposed addition. If the pre-allocation checks fail, or in other words, if sufficient resources for the proposed addition of the node are unavailable for allocation, then some embodiments may display an error message or simply prevent the addition from taking place. If the particular node can be allocated, then upon allocation in the second step, the cost token for the particular node will be assessed and the resource tree will be updated with the cost token and the RM key for the particular node. Upon deletion or detachment of the particular node from the tree, the cost tokens for the remaining nodes will be updated. For example, updates will be propagated upwards through the parent node to which the particular node was attached to, prior to its deletion. A plurality of nodes can be added or deleted in this manner, and the exemplary centralized hierarchical management scheme can handle such simultaneous updates, as well as, reallocate freed up resources where necessary. It will be appreciated that conventional switch assembly management schemes which are compartmentalized or restricted to pre-allocated resource maximums to each node will be unable to perform such dynamic updates and realignment of resources. Additionally, since resource types are also considered, e.g., based on exemplary RM key formats, the resource availability can be dynamically checked across multiple resource types, allowing for efficient resource type boundary management. Moreover, since the RM key format does not depend on any particular technology or naming convention, the exemplary techniques can be applied to any switch assembly structure in a platform or technology independent manner.

Some exemplary aspects also relate to aggregate ports. An aggregate port can refer to a logical device which may span a plurality of nodes. Thus, an aggregate port may in fact affect more than one port or node in a switch assembly system. Embodiments may handle aggregate ports by determining a list of cost tokens associated with all the ports affected by an aggregate port, and upon addition or deletion of the aggregate port, the cost token list can be used for updating the resource tree.

To explain exemplary aspects related to hierarchical resource management using cost tokens discussed above, specific numerical examples will be discussed for both regular ports, as well as, aggregate ports. With continuing reference to system 100 of FIG. 1, in one example, multi-chassis 102 may be known to support a maximum of 64,000 sub ports. The "sub ports" in this context may refer to nodes, except when aggregate ports are in consideration. In this example, each of chassis 104a-b may be known to support a maximum of 30,000 sub ports. As seen from this numerical example, the capacity of multi-chassis 102 is not fully utilized, and resources corresponding to 4000 sub ports can still remain unutilized even if the resources of each of chassis 104a-b are fully utilized.

As previously explained, allocating or burning a node, or sub port herein, at a particular level will have the effect of updating the existing resource tree upwards. In this case, allocating a sub port of chassis 104b, for example, would have the effect of burning a corresponding resource at the parent level, i.e. multi-chassis 102. Thus, in terms of cost tokens, 29,999 sub ports would remain unallocated and potentially free for use in chassis 104b, and 63,999 sub ports would remain in multi-chassis 102. If, on the other hand, an aggregate port is allocated, the above cost structure can differ. For example, if an aggregate port attached to the chassis level L2 requires the allocation of two ports, then even though two sub ports are burned at the chassis level L2, only one sub port would be burned at the multi-chassis level L1. In some cases, the aggregate port can span across both chassis 104a-b. Considering this later example for further illustration, if allocation of an aggregate port which spans across both chassis 104a-b is performed, then 29,999 sub ports would remain in each of these chassis 104a-b. However, only one sub port would have been burned at multi-chassis 102, and therefore, 63,999 sub ports would remain unallocated, as in the prior example.

In another numerical example to demonstrate the pre-allocation checks based on cost tokens, a case where all 30,000 sub ports of chassis 104b are utilized, while only 2 sub ports of chassis 104a are utilized is considered. In this scenario, 30,002 sub ports are burned at multi-chassis 102 and 33,998 sub ports remain free for allocation. However, if a device requests addition or attachment to chassis 104b, the resource tree, which is aware of the current state of system 100 will refuse to allow the proposed addition of the device. In some cases, the resource tree or hierarchical management system may be configured to provide an error message to this effect to the device, denying it allocation. This is because, even though 33,998 sub ports remain at multi-chassis 102, chassis 104b is fully utilized. On the other hand, the device may be able to attach to chassis 104a.

Figure 2:
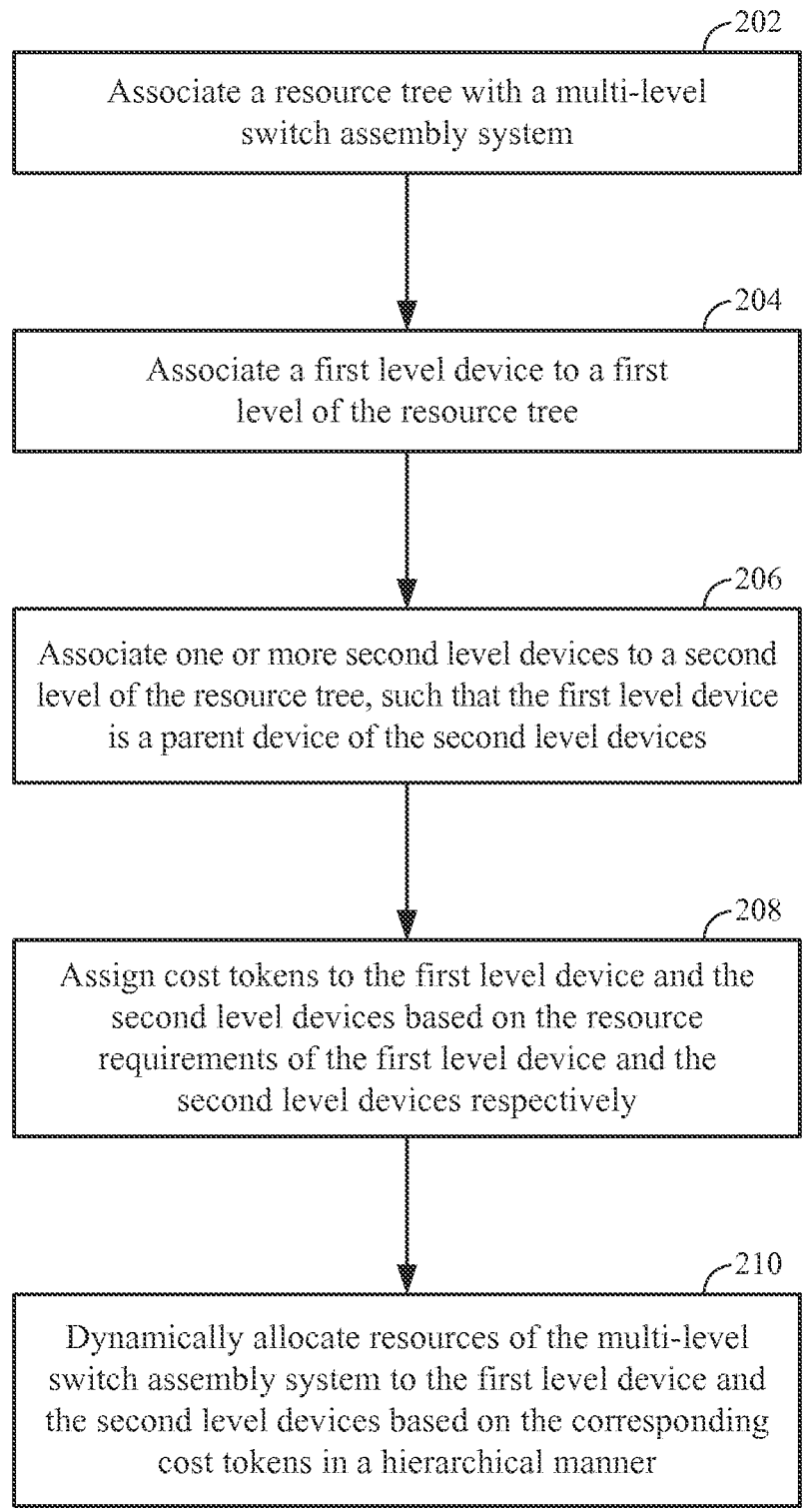
FIG. 2 is a flow chart illustration of a method of hierarchically managing the exemplary multi-level switch assembly system.

It will be appreciated that embodiments include various methods for performing the processes, functions and/or algorithms disclosed herein. For example, as illustrated in FIG. 2, an embodiment can include a method of method of managing a multi-level switch assembly system (e.g., 100), the method comprising: associating a resource tree with the multi-level switch assembly system—Block 202, comprising: associating a first level device (e.g., multi-chassis 102) to a first level (e.g., level L1) of the resource tree—Block 204; associating one or more second level devices (e.g., chassis 104a-b) to a second level (e.g., level L2) of the resource tree, such that the first level device is a parent device of the second level devices—Block 206; assigning cost tokens to the first level device and the second level devices based on the resource requirements of the first level device and the second level devices respectively—Block 208; and dynamically allocating resources of the multi-level switch assembly system to the first level device and the second level devices based on the corresponding cost tokens in a hierarchical manner—Block 210.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method hierarchical management of a switch assembly system. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing a multi-level switch assembly system, the method comprising:
   associating a resource tree with the multi-level switch assembly system, comprising:
   associating a first level device to a first level of the resource tree;
   associating one or more second level devices to a second level of the resource tree, such that the first level device is a parent device of the second level devices;
   assigning cost tokens to the first level device and the second level devices based on the resource requirements of the first level device and the second level devices respectively; and
   dynamically allocating resources of the multi-level switch assembly system to the first level device and the second level devices based on the corresponding cost tokens in a hierarchical manner;
   wherein assigning the cost tokens is further based on a resource management (RM) key associated with the first level device and the second level devices, wherein the RM key is a unique identification of position of the first level device and the second level devices within the resource tree.

2. The method of claim 1, further comprising dynamically updating the resource tree in a hierarchical manner based on additions or deletions of devices to one or more of the first level and the second level.

3. The method of claim 1, wherein the RM key is further based on a type of application to be executed on the multi-level switch assembly system.

4. The method of claim 1, further comprising, prior to allocating requested resources to a new second level device, determining, based on the cost token associated with the new second level device, whether sufficient resources are available for allocating the requested resources to the new second level device.

5. The method of claim 4, wherein the cost token associated with the new second level device is based on a cost token associated with one or more of the second level devices already present in the multi-level switch assembly system.

6. The method of claim 4, wherein the cost token associated with the new second level device is determined based on a stored cost token for a device of the type of the new second level device.

7. The method of claim 1, wherein the resources of the multi-level switch assembly system comprise one or more of a number of ports or bandwidth of the multi-level switch assembly system.

8. The method of claim 1, wherein the first level device comprises a multi-chassis, and one or more of the second level devices comprises a chassis.

9. The method of claim 1, further comprising:
   associating one or more third level devices to a third level of the resource tree, such that the first level device and one or more of the second level devices are parent devices of the third level devices;
   assigning cost tokens to the third level devices based on resource requirements of the third level devices; and
   dynamically allocating resources of the multi-level switch assembly system to the third level devices based on the corresponding cost tokens of the third level devices.

10. The method of claim 9, wherein one or more of the third level devices comprises a line blade.

11. The method of claim 9, further comprising:
    associating one or more fourth level devices to a fourth level of the resource tree, such that the first level device and one or more of the second level devices and third level devices are parent devices of the fourth level devices;
    assigning cost tokens to the fourth level devices based on resource requirements of the fourth level devices; and
    dynamically allocating resources of the multi-level switch assembly system to the fourth level devices based on the corresponding cost tokens of the fourth level devices.

12. The method of claim 11, wherein one or more of the fourth level devices comprises an end user device.

13. A multi-level switch assembly system comprising:
    a resource tree associated with the multi-level switch assembly system, wherein:
    a first level device is associated with a first level of the resource tree;
    one or more second level devices are associated with a second level of the resource tree, such that the first level device is a parent device of the second level devices;

cost tokens are associated with the first level device and the second level devices based on the resource requirements of the first level device and the second level devices respectively; and resources of the multi-level switch assembly system are dynamically allocated to the first level device and the second level devices based on the corresponding cost tokens in a hierarchical manner, wherein the assigned cost tokens are further based on a resource management (RM) key associated with the first level device and the second level devices, wherein the RM key is a unique identification of position of the first level device and the second level devices within the resource tree.

14. The multi-level switch assembly system of claim 13 further configured to dynamically update the resource tree in a hierarchical manner based on additions or deletions of devices to one or more of the first level and the second level.

15. The multi-level switch assembly system of claim 13, wherein the RM key is further based on a type of application to be executed on the multi-level switch assembly system.

16. The multi-level switch assembly system of claim 13, further configured to determine, prior to allocating requested resources to a new second level device, whether sufficient resources are available for allocating the requested resources to the new second level device based on cost tokens associated with a new second level device.

17. The multi-level switch assembly system of claim 16, wherein the cost token associated with the new second level device is determined based on a cost token associated with one or more of the second level devices already present in the multi-level switch assembly system.

18. The multi-level switch assembly system of claim 16, wherein the cost token associated with the new second level device is determined based on a stored cost token for a device of the type of the new second level device.

19. The multi-level switch assembly system of claim 13, wherein the resources of the multi-level switch assembly system comprise one or more of a number of ports or bandwidth of the multi-level switch assembly system.

20. The multi-level switch assembly system of claim 13, wherein the first level device comprises a multi-chassis, and one or more of the second level devices comprises a chassis.

21. The multi-level switch assembly system of claim 13 further comprising:
one or more third level devices associated with a third level of the resource tree, such that the first level device and one or more of the second level devices are parent devices of the third level devices,
wherein, cost tokens are assigned to the third level devices based on resource requirements of the third level devices; and
wherein, resources of the multi-level switch assembly system are dynamically allocated to the third level devices based on the corresponding cost tokens of the third level devices.

22. The multi-level switch assembly system of claim 21, wherein one or more of the third level devices comprises a line blade.

23. The multi-level switch assembly system of claim 21, further comprising:
one or more fourth level devices associated with a fourth level of the resource tree, such that the first level device and one or more of the second level devices and third level devices are parent devices of the fourth level devices,
wherein cost tokens are assigned to the fourth level devices based on resource requirements of the fourth level devices; and
wherein, resources of the multi-level switch assembly system are dynamically allocated to the fourth level devices based on the corresponding cost tokens of the fourth level devices.

24. The multi-level switch assembly system of claim 23, wherein one or more of the fourth level devices comprises an end user device.

25. A multi-level switch assembly system comprising:
means for associating circuitry configured to associate a resource tree with the multi-level switch assembly system, comprising:
means for associating circuitry configured to associate a first level device to a first level of the resource tree;
means for associating circuitry configured to associate one or more second level devices to a second level of the resource tree, such that the first level device is a parent device of the second level devices;
means for assigning circuitry configured to assign cost tokens to the first level device and the second level devices based on the resource requirements of the first level device and the second level devices respectively; and
means for dynamically allocating circuitry configured to dynamically allocate resources of the multi-level switch assembly system to the first level device and the second level devices based on the corresponding cost tokens in a hierarchical manner,
wherein the cost tokens are assigned further based on a resource management (RM) key associated with the first level device and the second level devices, wherein the RM key is a unique identification of position of the first level device and the second level devices within the resource tree.

26. A non-transitory computer-readable storage medium comprising code, which, when executed by a processor, causes the processor to perform operations for managing a multi-level switch assembly system, the non-transitory computer-readable storage medium comprising:
code for associating a resource tree with the multi-level switch assembly system, comprising:
code for associating a first level device to a first level of the resource tree;
code for associating one or more second level devices to a second level of the resource tree, such that the first level device is a parent device of the second level devices;
code for assigning cost tokens to the first level device and the second level devices based on the resource requirements of the first level device and the second level devices respectively; and
code for dynamically allocating resources of the multi-level switch assembly system to the first level device and the second level devices based on the corresponding cost tokens in a hierarchical manner,
wherein the code for assigning cost tokens is further based on a resource management (RM) key associated with the first level device and the second level devices, wherein the RM key is a unique identification of position of the first level device and the second level devices within the resource tree.

* * * * *